United States Patent
Cosgrove et al.

(10) Patent No.: US 11,015,563 B2
(45) Date of Patent: May 25, 2021

(54) AUTO START/STOP CONTROL BASED ON COOLED SEAT SIGNAL SYSTEMS AND METHODS

(71) Applicant: TOYOTA MOTOR ENGINEERING & MANUFACTURING NORTH AMERICA, INC., Plano, TX (US)

(72) Inventors: David W. Cosgrove, Milford, MI (US); Abhishek Srivastava, Ann Arbor, MI (US); Hidekazu Hirabayashi, Plano, TX (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/430,273

(22) Filed: Jun. 3, 2019

(65) Prior Publication Data
US 2020/0378352 A1    Dec. 3, 2020

(51) Int. Cl.
| | |
|---|---|
| *F02N 11/08* | (2006.01) |
| *B60N 2/56* | (2006.01) |
| *B60W 10/06* | (2006.01) |
| *B60H 1/00* | (2006.01) |
| *B60H 1/32* | (2006.01) |

(52) U.S. Cl.
CPC ....... *F02N 11/084* (2013.01); *B60H 1/00285* (2013.01); *B60H 1/00971* (2013.01); *B60H 1/3208* (2013.01); *B60W 10/06* (2013.01); *B60H 2001/3266* (2013.01); *B60H 2001/3273* (2013.01)

(58) Field of Classification Search
CPC ....... F02N 11/0814–0837; Y02T 10/48; B60H 1/00285; B60N 2/56–5692
USPC .................... 701/112, 113; 123/179.3, 179.4
See application file for complete search history.

(56) References Cited

U.S. PATENT DOCUMENTS

| | | | | |
|---|---|---|---|---|
| 4,572,430 A | * | 2/1986 | Takagi | B60H 1/00285 165/42 |
| 6,079,485 A | * | 6/2000 | Esaki | B60H 1/00285 165/42 |
| 6,105,667 A | * | 8/2000 | Yoshinori | B60H 1/00285 165/202 |

(Continued)

FOREIGN PATENT DOCUMENTS

| | | | | |
|---|---|---|---|---|
| DE | 102011112331 A1 | * | 3/2013 | ............... B60N 2/56 |
| DE | 102011112331 A1 | | 3/2013 | |

(Continued)

OTHER PUBLICATIONS

Non-Final Office Action, U.S. Appl. No. 16/411,049, dated Oct. 6, 2020.

*Primary Examiner* — John M Zaleskas
(74) *Attorney, Agent, or Firm* — Sheppard, Mullin, Richter & Hampton LLP; Hector A. Agdeppa; Daniel N. Yannuzzi

(57) ABSTRACT

Systems and methods for managing auto start of a vehicle during an auto-stop condition may include: determining an operational status of a vehicle climate control system; receiving a target air outlet temperature from the vehicle climate control system; receiving data indicating a state of a cooled seat of the vehicle; and inhibiting a start-engine command to restart an internal combustion engine of the vehicle because of a cabin cooling requirement when the data indicates that the cooled seat of the vehicle is activated.

18 Claims, 5 Drawing Sheets

(56) References Cited

U.S. PATENT DOCUMENTS

| | | | |
|---|---|---|---|
| 6,237,675 B1* | 5/2001 | Oehring | B60H 1/00285 165/288 |
| 7,890,243 B2* | 2/2011 | Abendroth | F02N 11/0825 701/112 |
| 9,388,750 B2 | 7/2016 | Be | |
| 2007/0194748 A1* | 8/2007 | Yamaguchi | H02J 7/0032 320/104 |
| 2008/0168766 A1* | 7/2008 | Oomura | B60H 1/004 60/320 |
| 2013/0213631 A1* | 8/2013 | Ichishi | B60H 1/00021 165/202 |
| 2014/0278019 A1 | 9/2014 | Be | |
| 2014/0338882 A1* | 11/2014 | Rollinson | B60H 1/00742 165/203 |
| 2015/0088404 A1* | 3/2015 | Geissenhoener | B60K 28/04 701/112 |
| 2015/0114016 A1* | 4/2015 | Ota | B60H 1/00778 62/133 |
| 2015/0273982 A1* | 10/2015 | Takata | B60H 1/322 701/48 |
| 2016/0016455 A1* | 1/2016 | Miyagawa | B60H 1/00764 62/133 |
| 2016/0332502 A1* | 11/2016 | Rollinson | B60H 1/00742 |
| 2017/0253245 A1* | 9/2017 | Khafagy | B60K 28/04 |
| 2018/0003143 A1* | 1/2018 | Khafagy | B60L 50/10 |
| 2018/0023493 A1* | 1/2018 | Khafagy | F02N 11/0825 477/98 |
| 2018/0043878 A1* | 2/2018 | Khafagy | B60W 10/06 |
| 2018/0306157 A1* | 10/2018 | Lee | F02N 11/04 |
| 2018/0345887 A1* | 12/2018 | Brombach | B60R 16/03 |
| 2018/0362013 A1* | 12/2018 | Ungermann | B60T 7/14 |
| 2020/0362808 A1* | 11/2020 | Cosgrove | B60H 1/00285 |

FOREIGN PATENT DOCUMENTS

| | | | | |
|---|---|---|---|---|
| EP | 0601300 A1 * | 6/1994 | | B60K 25/00 |
| EP | 0601300 A1 | 6/1994 | | |
| JP | 2000142095 A * | 5/2000 | | B60K 25/00 |
| JP | 2000142095 A | 5/2000 | | |
| JP | 2005297816 A * | 10/2005 | | B60H 1/00849 |
| JP | 2005297816 A | 10/2005 | | |
| JP | 2010247777 A * | 11/2010 | | B60H 1/00849 |
| JP | 2010247777 A | 11/2010 | | |

* cited by examiner

AUTO START/STOP CONTROL BASED ON COOLED SEAT SIGNAL SYSTEMS AND METHODS

TECHNICAL FIELD

The present disclosure relates generally to vehicular technology. More particularly, various embodiments relate to systems and methods for delaying or canceling an engine-start event for auto start/stop operations while maintaining occupant comfort.

DESCRIPTION OF RELATED ART

Increases in fuel prices and concerns about the consumption of fossil fuel in general have led consumers to demand more fuel-efficient vehicles. (Corporate Average Fuel Economy) CAFE regulations also mandate fuel economy standards for vehicle manufacturers selling vehicles in the United States. Accordingly, automobile designers have sought out new ways to improve the fuel economy of their vehicles.

One such way automobile manufacturers have improved fuel economy and their lineups is to include auto start/stop feature with their vehicles. The auto start/stop feature automatically turns off the vehicle's internal combustion engine when the vehicle comes to a complete stop such as, for example, at a traffic light. When the operator removes his or her foot from the brake pedal, the engine automatically starts so that the operator can continue on his or her way. This feature avoids idling, which conserves fuel and reduces emissions.

Contemporary auto start/stop systems typically evaluate a number of factors to determine whether the internal combustion engine can be stopped automatically and whether it should be restarted in advance of a foot-off-brake event. Typically, such systems evaluate the then-current state-of-charge of the battery and the draw that vehicle accessories and other systems are requiring from the battery at the time. For example, where the vehicle's (Heating Ventilating and Air-Conditioning) HVAC system is operating, the vehicle may determine that the engine cannot be stopped, or that it must be started in advance of a foot-off-brake event so that the climate-control system can continue to run to maintain occupant comfort. Starting the vehicle in advance of a foot-off-brake event consumes more fuel than waiting until the foot-off-brake event occurs to restart the vehicle. Similarly, rejecting an auto stop command because the vehicle's HVAC system is required also consumes more fuel than allowing the auto stop command to turn off the internal combustion engine.

BRIEF SUMMARY OF THE DISCLOSURE

According to various embodiments of the disclosed technology, systems and methods can be configured to delay or cancel a request to start the engine during an auto start/stop operation when one or more seat coolers (e.g., airconditioned or ventilated seat) in the vehicle are activated. Delaying or canceling the start-engine request in conjunction with auto start/stop operations can improve fuel economy and reduce emissions while maintaining some level of human comfort as it relates to the cabin temperature of the vehicle.

Embodiments may be implemented to determine the status of one or more seat coolers in the vehicle, and if a seat cooler is turned on, the system may delay, cancel, override or otherwise inhibit a start-engine request that is generated to enable sufficient operation of the vehicle's passenger compartment air conditioner. Some implementations may simply cancel the start-engine request or delay the auto-start feature to accomplish this.

Embodiments may also include sensors to determine the presence of a passenger in one or more seating positions of the vehicle, and to determine whether a corresponding seat cooler is activated for each passenger in the vehicle before delaying or canceling a start-engine request. Other vehicle parameters such as blower motor status, cabin temperature and the required air temperature at the HVAC vent outlets (target air outlet, or TAO) may also be evaluated when determining whether a start-engine request can be inhibited.

In one embodiment, a method for managing auto start of a vehicle during an auto-stop condition, the method may include: determining an operational status of a vehicle climate control system; receiving a target air outlet temperature from the vehicle climate control system; receiving data indicating a state of a cooled seat of the vehicle; and inhibiting a start-engine command to restart an internal combustion engine of the vehicle because of a cabin cooling requirement when the data indicates that the cooled seat of the vehicle is activated.

The method may further include determining whether a cabin temperature of the vehicle is above a determined cabin threshold temperature, and wherein inhibiting a start-engine command to restart the internal combustion engine may include delaying a request to restart the vehicle because of a cabin cooling requirement when the data indicates that the cooled seat of the vehicle is activated and the cabin temperature of the vehicle is above the determined cabin threshold temperature.

The method may further include sensors for determining occupancy of the vehicle and the inhibiting the start-engine command to restart the internal combustion engine operation only occurs if a cooled seat is activated for each occupied seating position of the vehicle.

Inhibiting a start-engine command to restart the internal combustion engine because of a cabin cooling requirement may include delaying the start-vehicle command for a determined period of time. Inhibiting a start-engine command to restart the internal combustion engine because of a cabin cooling requirement may include delaying the start-vehicle command until another vehicle event causes a restart.

A vehicle, may include: a plurality of sensors; a climate control system; and an auto-start control circuit comprising an input to receive data indicating a state of a cooled seat of the vehicle and an input to receive data from the climate control system indicating a target air outlet temperature, the auto-start control circuit configured to determine an operational status of a vehicle climate control system; and to inhibit a start-engine command to restart the internal combustion engine because of a cabin cooling requirement when the data indicates that the cooled seat of the vehicle is activated.

The vehicle may further include a cabin temperature sensor and wherein the auto-start control circuit is further configured to determine whether a cabin temperature of the vehicle is above a determined cabin threshold temperature, and wherein inhibiting the start-engine command to restart the internal combustion engine may include delaying a start-engine command to restart the internal combustion engine because of a cabin cooling requirement when the data indicates that the cooled seat of the vehicle is activated and the cabin temperature of the vehicle is above the determined cabin threshold temperature.

The vehicle may further include sensors for determining occupancy of the vehicle and inhibiting the start-vehicle command only occurs if a cooled seat is activated for each occupied seating position of the vehicle. Inhibiting a start-engine command to restart the internal combustion engine because of a cabin cooling requirement may include delaying the start-vehicle command for a determined period of time. Inhibiting a start-engine command to restart the internal combustion engine because of a cabin cooling requirement may include delaying the start-vehicle command until another vehicle event causes a restart.

An auto start control circuit, including a processor and a non-transitory machine-readable medium storing machine-readable instructions executable by the processor, the machine-readable instructions causing the processor to perform the operations of: determining an operational status of a vehicle climate control system;

determining a target air outlet temperature from the vehicle climate control system; receiving data indicating a state of a cooled seat of the vehicle; and inhibiting a start-engine command to restart the internal combustion engine because of a cabin cooling requirement when the data indicates that the cooled seat of the vehicle is activated.

The auto start control circuit may further include determining whether a coolant temperature of the vehicle is above a determined cabin threshold temperature, and wherein inhibiting a start-engine command to restart the internal combustion engine may include delaying a request to restart the vehicle because of a cabin cooling requirement when the data indicates that the cooled seat of the vehicle is activated and the coolant temperature of the vehicle is below the determined cabin threshold temperature.

A method for managing auto start of a vehicle during an auto-stop condition may include: determining an operational status of a vehicle climate control system; receiving a target air outlet temperature from the vehicle climate control system; receiving data indicating a state of a cooled seat of the vehicle; and initiating a stop-engine command to stop an internal combustion engine of the vehicle despite a cabin cooling requirement when the data indicates that the cooled seat of the vehicle is activated.

The method may further include sensors for determining occupancy of the vehicle and initiating a stop-engine command to stop the internal combustion engine of the vehicle operation only occurs if a cooled seat is activated for each occupied seating position of the vehicle.

A vehicle, may include: a plurality of sensors;

a climate control system; and an auto-start control circuit comprising an input to receive data indicating a state of a cooled seat of the vehicle and an input to receive data from the climate control system indicating a target air outlet temperature, the auto-start control circuit configured to determine an operational status of a vehicle climate control system; and to initiating a stop-engine command to stop the internal combustion engine of the vehicle operation despite a cabin cooling requirement when the data indicates that the cooled seat of the vehicle is activated.

The vehicle may further include a cabin temperature sensor and wherein the auto-start control circuit is further configured to determine whether a cabin temperature of the vehicle is above a determined cabin threshold temperature, and wherein inhibiting the start-engine command to restart the internal combustion engine may include delaying a start-engine command to restart the internal combustion engine because of a cabin cooling requirement when the data indicates that the cooled seat of the vehicle is activated and the cabin temperature of the vehicle is above the determined cabin threshold temperature.

The vehicle may further include sensors for determining occupancy of the vehicle and wherein inhibiting the start-vehicle command only occurs if a cooled seat is activated for each occupied seating position of the vehicle.

An auto start control circuit including a processor and a non-transitory machine-readable medium storing machine-readable instructions executable by the processor, the machine-readable instructions causing the processor to perform the operations of: determining an operational status of a vehicle climate control system; receiving a target air outlet temperature from the vehicle climate control system; receiving data indicating a state of a cooled seat of the vehicle; and inhibiting a start-engine command to restart the internal combustion engine because of a cabin cooling requirement when the data indicates that the cooled seat of the vehicle is activated.

An auto start control circuit, including a processor and a non-transitory machine-readable medium storing machine-readable instructions executable by the processor, the machine-readable instructions causing the processor to perform the operations of: determining an operational status of a vehicle climate control system; receiving a target air outlet temperature from the vehicle climate control system; receiving data indicating a state of a cooled seat of the vehicle; and initiating a stop-engine command to stop an internal combustion engine of the vehicle despite a cabin cooling requirement when the data indicates that the cooled seat of the vehicle is activated.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can be configured to delay or cancel a request to start the engine during the auto start/stop operation when one or more seat coolers (e.g., airconditioned or ventilated seat) in the vehicle are activated. Delaying or canceling the start-engine request in conjunction with auto start/stop operations can improve fuel economy and reduce emissions while maintaining some level of human comfort as it relates to the cabin temperature of the vehicle.

Embodiments may be implemented to determine the status of one or more seat coolers in the vehicle, and if a seat cooler is turned on, the system may delay, cancel, override or otherwise inhibit a start-engine request that is generated to enable sufficient operation of the vehicle's passenger compartment air conditioner. Some implementations may simply cancel the start-engine request or delay the auto-start feature to accomplish this.

Embodiments may also include sensors to determine the presence of a passenger in one or more seating positions of the vehicle, and to determine whether a corresponding seat cooler is activated for each passenger in the vehicle before delaying or canceling a start-engine request. Other vehicle parameters such as blower motor status, cabin temperature and the required air temperature at the HVAC vent outlets (target air outlet, or TAO) may also be evaluated when determining whether a start-engine request can be inhibited.

Figure 1:
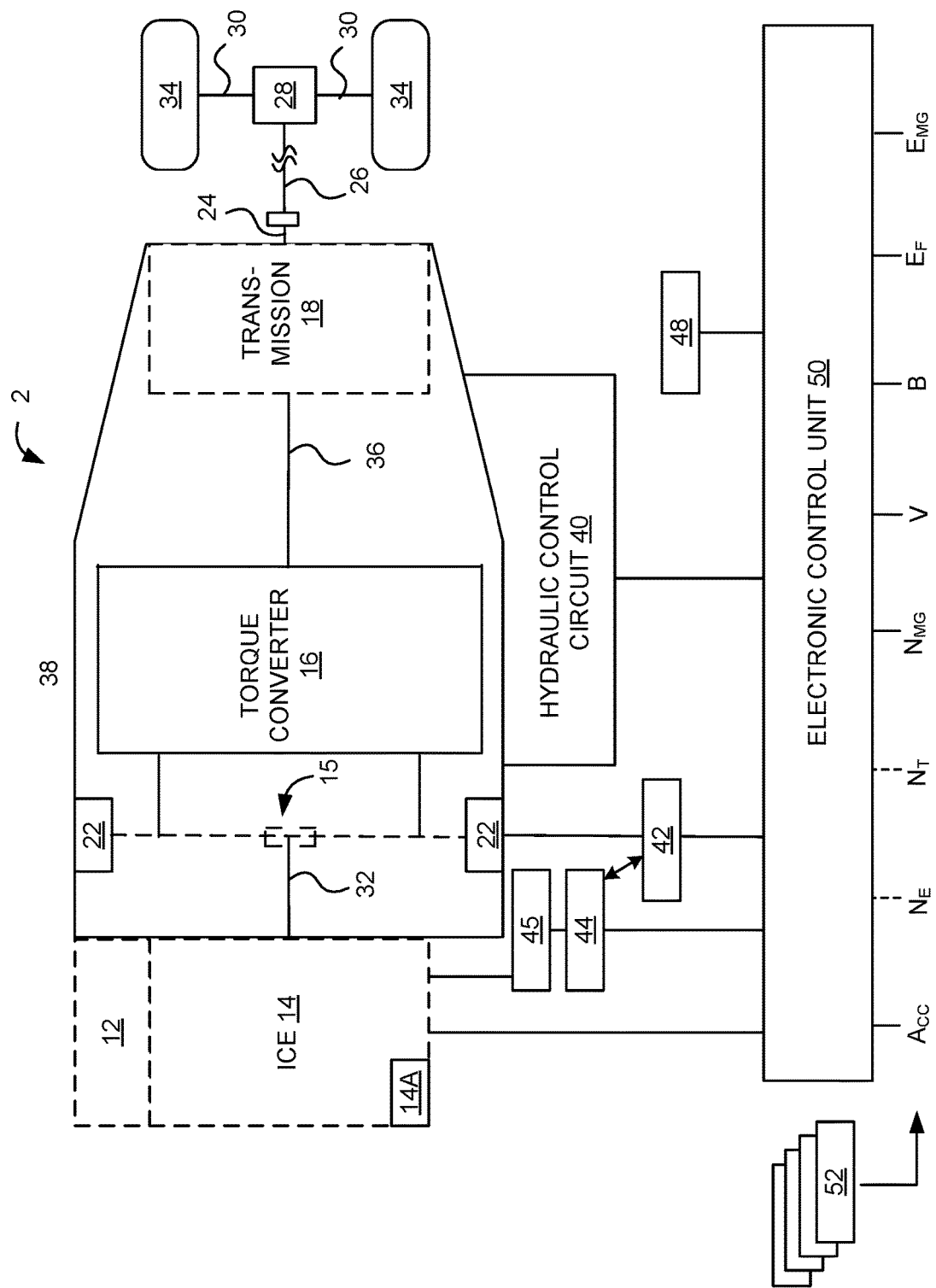
FIG. 1 is a schematic representation of an example vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods can be implemented in other types of vehicle including gasoline- or diesel-powered vehicles, fuel-cell vehicles, electric vehicles, or other vehicles in which battery thermal management can impact cabin comfort.

FIG. 1 illustrates a drive system of a vehicle that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission.

Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor).

Accordingly, vehicle 102 can include a plurality of sensors 52 that can be used to detect various conditions internal or external to the vehicle and provide sensed conditions to electronic control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, and so on.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, other vehicles, parking spaces, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as an example of a vehicle with which embodiments of the disclosed technology may be implemented. One of ordinary skill in the art reading this description will understand how the disclosed embodiments can be implemented with other vehicle platforms.

Figure 2:
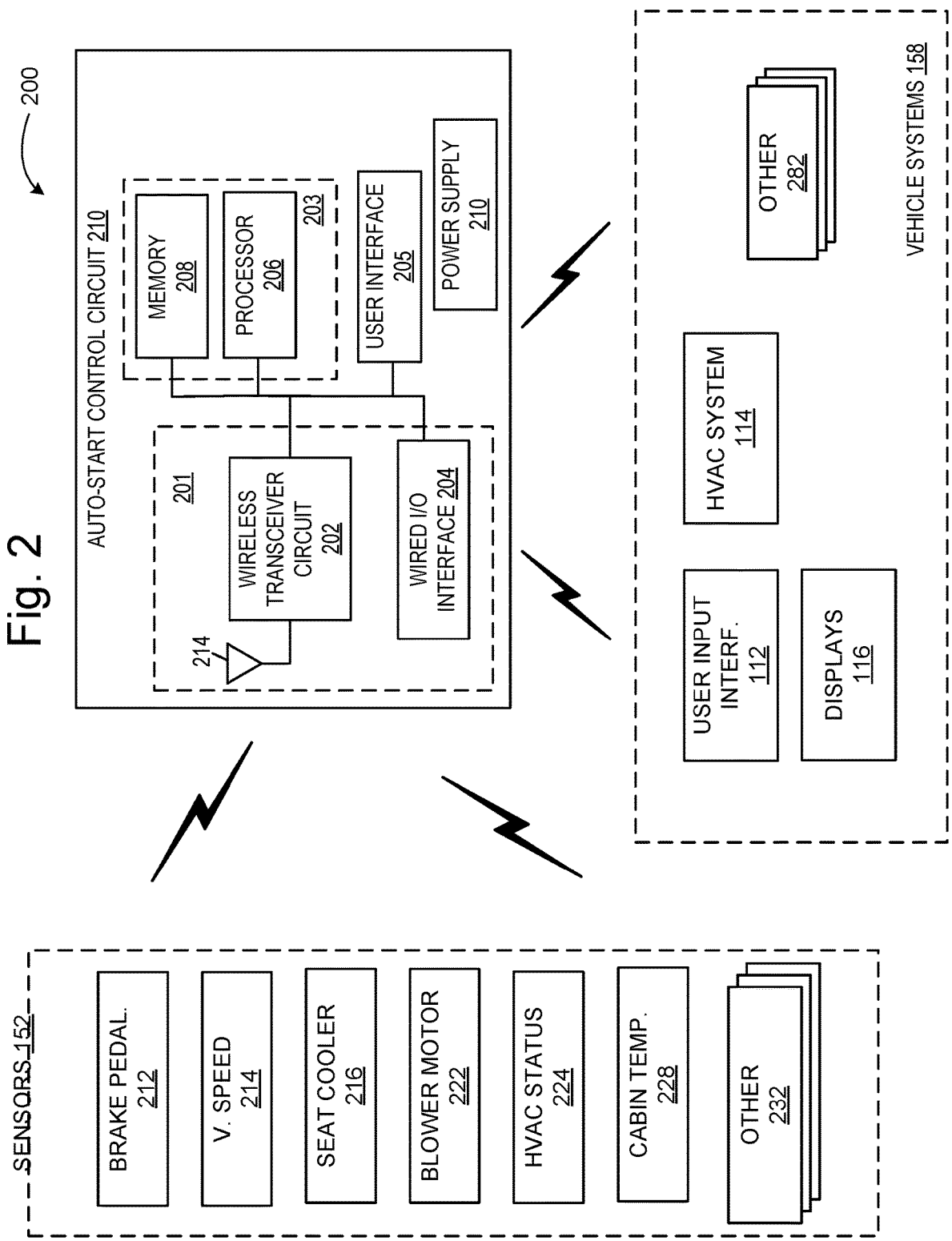
FIG. 2 illustrates an example architecture for a cabin-temperature management system in accordance with one embodiment of the systems and methods described herein.

FIG. 2 illustrates an example architecture for an auto start/stop system in accordance with one embodiment of the systems and methods described herein. Referring now to FIG. 2, in this example, auto start/stop system 200 includes an auto start control circuit 210, a plurality of sensors 152, and a plurality of vehicle systems 158. Sensors 152 and vehicle systems 158 can communicate with auto start control circuit 210 via a wired or wireless communication interface. Although sensors 152 and vehicle systems 158 are depicted as communicating with auto start control circuit 210, they can also communicate with each other as well as with other vehicle systems. In some embodiments, auto start control circuit 210 can be implemented as an ECU or as part of an ECU such as, for example electronic control unit 50. In other embodiments, auto start control circuit 210 can be implemented independently of the ECU.

Auto start control circuit 210 in this example includes a communication circuit 201, a decision circuit 203 (including a processor 206 and memory 208 in this example) and a power supply 212. Components of auto start control circuit 210 are illustrated as communicating with each other via a data bus, although other communication in interfaces can be included. Auto start control circuit 210 in this example also includes a user interface 205 such as an interface to receive a signal from a dash-mounted, console-mounted, or steering-wheel-mounted switch that can be operated by the user to activate or deactivate the auto start control circuit 210 manually.

Processor 206 can include a GPU, CPU, microprocessor, or any other suitable processing system. The memory 208 may include one or more various forms of memory or data storage (e.g., flash, RAM, etc.) that may be used to store setpoints, sensor readings, instructions and variables for processor 206 as well as any other suitable information. Memory 208, can be made up of one or more modules of one or more different types of memory, and may be configured to store data and other information as well as operational instructions that may be used by the processor 206 to auto start control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a auto start control circuit 210.

Communication circuit 201 includes either or both a wireless transceiver circuit 202 with an associated antenna 214 and a wired I/O interface 204 with an associated hardwired data port (not illustrated). As this example illustrates, communications with auto start control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by auto start control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on example vehicle 10. In the example illustrated in FIG. 2, sensors 152 include brake pedal sensor 212, vehicle speed sensor 214, seat cooler sensor 216, blower motor sensor 222, HVAC status sensor 224, and cabin temperature sensor 228. One or more of these sensors can be made up of an individual sensor or multiple sensors. Additional sensors 232 can also be included as may be appropriate for a given implementation of auto start/stop circuit 200.

Brake pedal sensor 212 may include one or more sensors to monitor whether and how much pressure is applied to the brake pedal by an operator as well as one or more sensors to monitor direction and magnitude of brake pedal travel. Seat cooler sensor 216 may include one or more sensors to detect the actuation status of seat coolers in the vehicle. For example, seat cooler sensor 216 may monitor the on off the state of one or more seat coolers (e.g., ventilated, air conditioned, or otherwise cooled seat) in the vehicle as well as the level at which a seat cooler is set (e.g., highest level, middle level, lowest level).

HVAC status sensor 224 may include one or more sensors to monitor the current status of a climate control system such as, for example, HVAC system 114. These one or more sensors may be configured to monitor, for example, the HVAC system mode (e.g., on, off, heat, AC, etc.), temperature settings for the system and the like. Blower motor sensor 222 may include one or more sensors to monitor blower motor settings (e.g., fan-speed settings) of the HVAC system. Instead of or in addition to one or more sensors in HVAC status sensor 224, the same or similar information may be received directly from HVAC system 114.

Cabin temperature sensor 228 can be used to monitor the cabin temperature of the vehicle. This can include one or more sensors to measure one or more cabin temperature such as overall cabin temperatures, localized cabin temperatures (e.g., front cabin, rear cabin, etc.), temperature of the air at the air vent outlets, and so on.

Vehicle systems 158 can include any of a number of different vehicle components or subsystems used in operation of the vehicle. In this example, the vehicle systems 158 include a user input interface 112 such as, for example, one or more of buttons, switches, touchscreen displays, voice command systems, and so on. HVAC system 114 may include, for example, the heating, ventilating and air-conditioning system used to control the temperature inside the vehicle. Displays 116 may include, for example, one or more indicator lights, LED displays, LCD displays, segment displays or other mechanisms to display vehicle information to the operator and occupants. Displays 116 and user interface 112 may be implemented, for example, as part of a vehicle head unit, or they may be implemented as displays and interfaces other than the head unit. Other vehicle systems 282 may also be included as part of vehicle systems 158.

During operation, auto start control circuit 210 can receive information from various vehicle sensors to determine whether the auto stop mode may be activated or extended. Communication circuit 201 can be used to transmit and receive information between auto start control circuit 210 and sensors 152, and auto start control circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to delay or cancel a start-engine request. Additionally, communication circuit 201 can be used to send a start or stop signal or other information to various vehicle systems 158 as part of delaying, denying or initiating a start-engine command.

Figure 3:
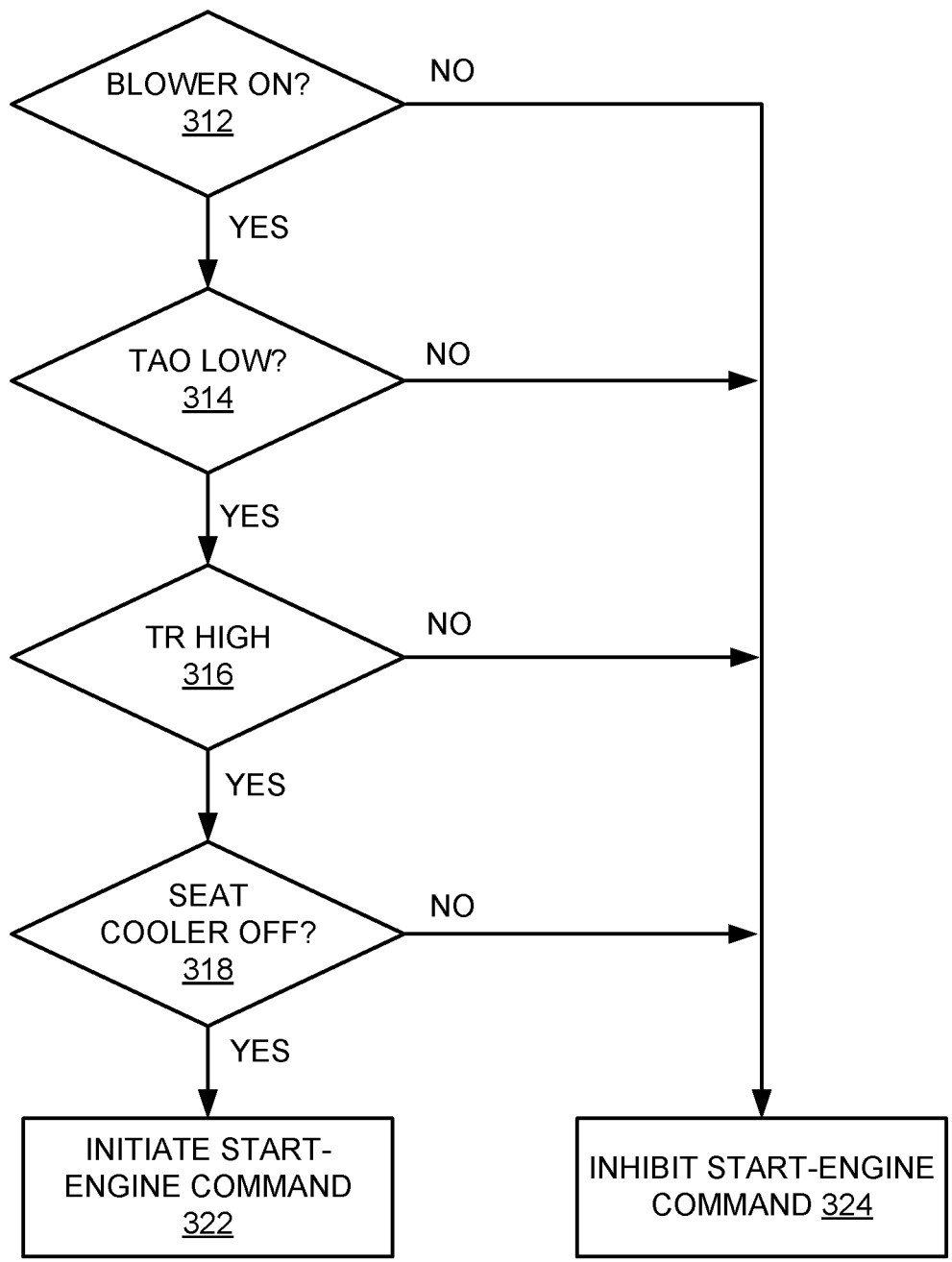
FIG. 3 illustrates an example high-level operation of a system for determining to initiate a start-engine command in conjunction with HVAC cooling operation in accordance with one embodiment.

FIG. 3 illustrates an example high-level operation of a system for determining whether to issue a start-engine command in conjunction with HVAC cooling operation (e.g., ventilation or air conditioning) in accordance with one embodiment. In the example described with respect to FIG. 3, the system evaluates the blower motor, target air-outlet temperature (TAO), cabin temperature and seat cooler status to determine whether to initiate or deny a start-engine command. The system may be configured to inhibit a start-engine command to restart the vehicle's ICE because of a cabin cooling requirement when the evaluated data indicates that the cooled seat or seats of the vehicle is or are in an ON state. For example for a vehicle in an auto-stop condition, restarting the vehicle because of a cabin cooling request may be delayed for a determined period of time. In another embodiment, it may be delayed until another vehicle event causes a restart such as, for example, a foot-off-brake event or such as where other vehicle systems may require a restart.

Referring now to FIG. 3, at operation 312 the system determines an operational status of the vehicle climate control system. In this example, the system determines whether the blower motor for the vehicle HVAC system is turned on. For example, auto start control circuit 210 may evaluate information obtained from blower motor sensor 222 to determine whether the blower motor is on. Auto start control circuit 210 may also determine in some embodiments a blower-motor speed such as a fan speed at which an HVAC system fan is operating. If the blower motor is not operating, this indicates that the HVAC system is turned off and not currently being used to cool the vehicle. Accordingly, there is no need to initiate a start-engine command to accommodate the HVAC system and a start-engine command is not initiated at this time. This is illustrated at operation 324. On the other hand, if the blower motor is operating the process continues at operation 314.

At operation 314, the system determines whether the required target air outlet temperature (TAO) is below a determined threshold. For example, the system may receive target air outlet information from the HVAC system 114 based on desired and current temperatures (e.g., as determined by climate control settings) and current cabin temperatures. If the target air outlet temperature is not below a determined threshold, the engine need not be restarted to achieve the desired air outlet temperature for cooling the cabin. For example, if the target air outlet temperature is not below the current coolant temperature (e.g., as determined by a coolant temperature sensor 226) by more than a determined threshold amount, additional cold air is not needed from the climate control system to achieve the desired target air outlet temperature. Accordingly, a start-engine command is not initiated at this time as illustrated at operation 324. On the other hand, if the blower motor is operating (operation 312) and the required target air outlet (TAO) is sufficiently low such that additional cooling is required from the climate control system, the system proceeds to operation 316.

At operation 316, the system checks to determine whether the vehicle cabin temperature is above a determined threshold. The threshold may be determined, for example, as a threshold above which vehicle occupants might be uncomfortable even with their cooled seats actuated. For example, the cabin temperature threshold might be a temperature at or above which seat coolers will be insufficient to maintain passenger comfort. The threshold temperature can be determined, for example, as an absolute temperature of the cabin. For example, the threshold temperature might be set at 70° F., 71° F., 72° F., 73° F., 74° F., 75° F., 76° F., 77° F., 70° F., 79° F., 80° F., or other threshold temperature (whether in Fahrenheit, Celsius or other temperature scale) above which seat coolers will not be sufficient to maintain a determined level of comfort for the passengers. The threshold temperature might also be determined, for example, as a temperature relative to the vehicle climate control settings. For example, if the user has set an automatic climate control system to a desired temperature, the determined threshold might be a set number of degrees above the desired temperature. This temperature differential between the climate control setting and the cabin temperature threshold might be determined as, for example, 1° F., 2° F., 3° F., 4° F., 5° F., 6° F., 7° F., 8° F., 9° F., 10° F., or as some other temperature difference or gradient (whether in Fahrenheit, Celsius or other temperature scale). As yet another example, the cabin temperature threshold might be determined as a function of a nonquantitative climate control setting such as, for example, a slider or knob that can set the temperature from "Cold" to "Hot" without setting a specific temperature setting.

If the vehicle cabin temperature is not above the determined threshold, it would be unnecessary to initiate a start-engine command for the purposes of accommodating the HVAC system to cool the vehicle, and a start-engine command is therefore not initiated. This is illustrated at operation 324. On the other hand, if the cabin temperature is sufficiently warm such that the vehicle air conditioning might be required to maintain passenger comfort, the process continues at operation 318.

At operation 318, the system checks the sensor data to determine the status of one or more seat coolers of the vehicle. In some implementations, the system may only check the status of the vehicle operator's seat cooler. In other implementations, the system may check the status of all seat coolers. In yet other implementations, the system may use sensors to determine which seats are occupied and only check the status of the seat coolers for those occupied seats. If the appropriate seat cooler or coolers are activated, it is anticipated that sufficient cooling is being provided by the seat coolers to the vehicle occupants. Accordingly, the system may be configured to not initiate a start-engine command at operation 324 when the seat coolers are turned on. However, if the seat cooler or coolers are not turned on, the process progresses to operation 322 at which time a start-engine command is generated because of a cabin cooling requirement (i.e., the engine is required to operate the air-conditioning-system compressor to provide sufficient chilled air for the cabin) and sent to the vehicle starter to start the internal combustion engine (or to disable an auto-stop stop-engine command).

Although the above illustrated embodiments are shown with reference to initiating or denying a start engine request, the same logic may be used to determine whether or not to issue a stop-engine request. In other words, while the vehicle is in an auto-stop condition, denying a start-engine command may mean that the engine is not started. However, if the vehicle is running but otherwise ready for an auto-stop condition, denying a start engine command may mean denying a requirement that the engine remain on for purposes of cooling the cabin with the HVAC system. Likewise, while the vehicle is in an auto-stop condition, allowing a start-engine command may mean that the engine is re-started. But, if the vehicle is running but otherwise ready for an auto-stop condition (e.g., in an auto-stop mode), the system may be configured to initiate a stop-vehicle command to turn off an internal combustion engine even though the cabin cooling requirements may otherwise dictate that the engine should remain running.

Figure 4:
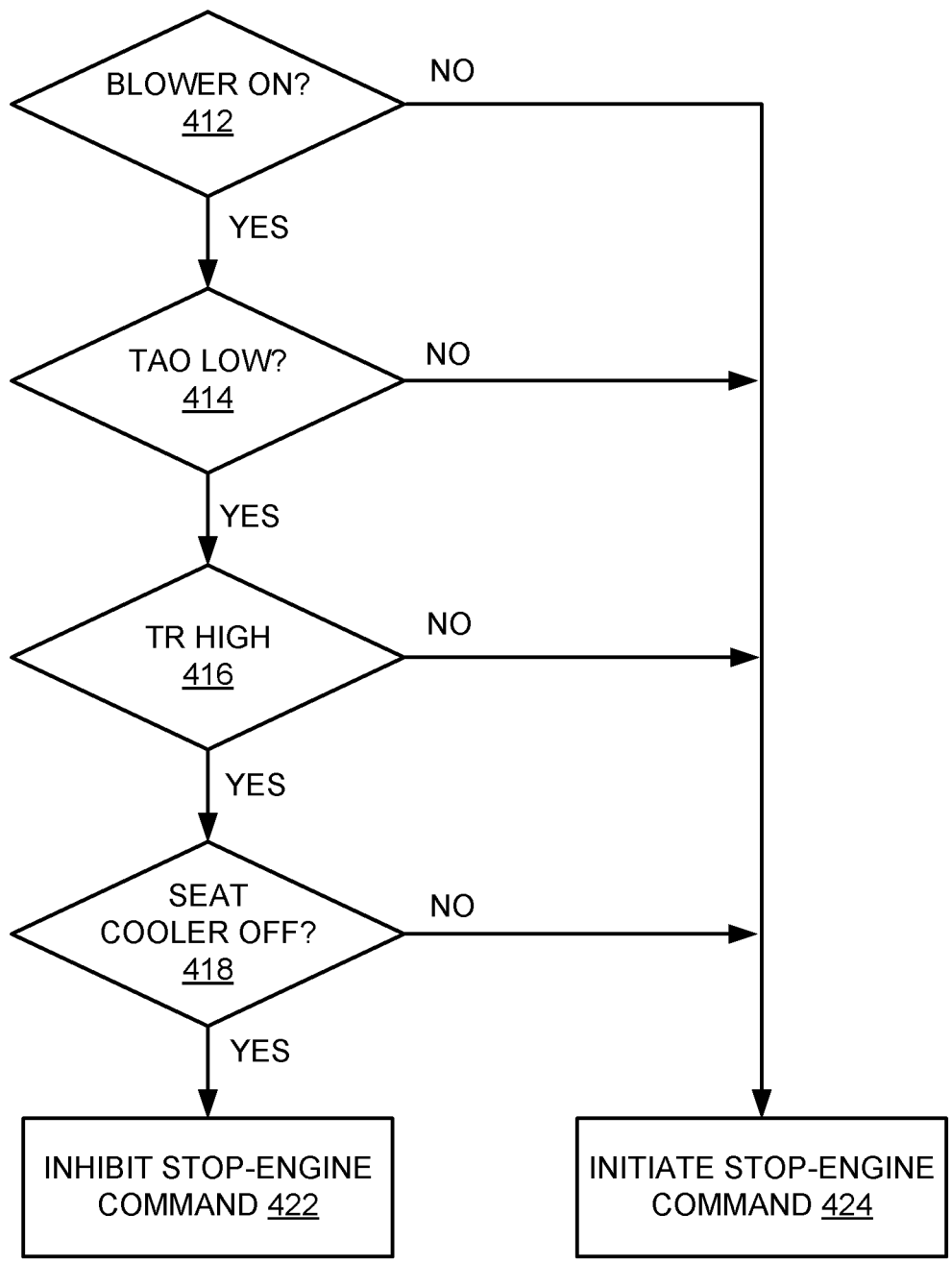
FIG. 4 illustrates an example of allowing a stop engine command to occur when one or more seat coolers are active even though a cabin cooling requirement is present.

FIG. 4 is a diagram illustrating an example of allowing a stop engine command to occur when one or more seat coolers are active even though a cabin cooling requirement is present. In the example described with respect to FIG. 4, the system evaluates the blower motor, target air-outlet temperature (TAO), cabin temperature and seat cooler status to determine whether to initiate or deny a start-engine command. The system may be configured to inhibit a start-engine command to restart the vehicle's internal combustion engine because of a cabin cooling requirement when the evaluated data indicates that the cooled seat or seats of the vehicle is or are in an ON state. For example for a vehicle in an auto-stop condition, restarting the vehicle because of a cabin cooling request may be delayed for a determined period of time. In another embodiment, it may be delayed until another vehicle event causes a restart such as, for example, a foot-off-brake event or such as where other vehicle systems may require a restart.

Referring now to FIG. 4, at operation 412 the system determines an operational status of the vehicle climate control system. In this example, the system determines whether the blower motor for the vehicle HVAC system is turned on. For example, auto start control circuit 210 may evaluate information obtained from blower motor sensor 222 to determine whether the blower motor is on. Auto start control circuit 210 may also determine in some embodiments a blower-motor speed such as a fan speed at which an HVAC system fan is operating. If the blower motor is not operating, this indicates that the HVAC system is turned off and not currently being used to cool the vehicle. Accordingly, there is no need to initiate a start-engine command to accommodate the HVAC system and a stop-engine command is initiated at this time. This is illustrated at operation 424. On the other hand, if the blower motor is operating the process continues at operation 414.

At operation 414, the system determines whether the required target air outlet temperature (TAO) is below a determined threshold. For example, the system may receive target air outlet information from the HVAC system 114 based on desired and current temperatures (e.g., as determined by climate control settings) and current cabin temperatures. If the target air outlet temperature is not below a determined threshold, the engine need not be restarted to achieve the desired air outlet temperature for cooling the cabin. For example, if the target air outlet temperature is not below the current coolant temperature (e.g., as determined by a coolant temperature sensor 226) by more than a determined threshold amount, additional cold air is not needed from the climate control system to achieve the desired target air outlet temperature. Accordingly, a stop-engine command is initiated at this time as illustrated at operation 424. On the other hand, if the blower motor is operating (operation 412) and the required target air outlet (TAO) is sufficiently low such that additional cooling is required from the climate control system, the system proceeds to operation 416.

At operation 416, the system checks to determine whether the vehicle cabin temperature is above a determined threshold. The threshold may be determined, for example, as a threshold above which vehicle occupants might be uncomfortable even with their cooled seats actuated. For example, the cabin temperature threshold might be a temperature at or above which seat coolers will be insufficient to maintain passenger comfort. The threshold temperature can be determined, for example, as an absolute temperature of the cabin. For example, the threshold temperature might be set at 70° F., 71° F., 72° F., 73° F., 74° F., 75° F., 76° F., 77° F., 70° F., 79° F., 80° F., or other threshold temperature (whether in Fahrenheit, Celsius or other temperature scale) above which seat coolers will not be sufficient to maintain a determined level of comfort for the passengers. The threshold temperature might also be determined, for example, as a temperature relative to the vehicle climate control settings. For example, if the user has set an automatic climate control system to a desired temperature, the determined threshold might be a set number of degrees above the desired temperature. This temperature differential between the climate control setting and the cabin temperature threshold might be determined as, for example, 1° F., 2° F., 3° F., 4° F., 5° F., 6° F., 7° F., 8° F., 9° F., 10° F., or as some other temperature difference or gradient (whether in Fahrenheit, Celsius or other temperature scale). As yet another example, the cabin temperature threshold might be determined as a function of a nonquantitative climate control setting such as, for example, a slider or knob that can set the temperature from "Cold" to "Hot" without setting a specific temperature setting.

If the vehicle cabin temperature is not above the determined threshold, it would be unnecessary to initiate a start-engine command for the purposes of accommodating the HVAC system to cool the vehicle, and a stop-engine command is initiated. This is illustrated at operation 424. On the other hand, if the cabin temperature is sufficiently warm such that the vehicle air conditioning might be required to maintain passenger comfort, the process continues at operation 418.

At operation 418, the system checks the sensor data to determine the status of one or more seat coolers of the vehicle. In some implementations, the system may only check the status of the vehicle operator's seat cooler. In other implementations, the system may check the status of all seat coolers. In yet other implementations, the system may use sensors to determine which seats are occupied and only check the status of the seat coolers for those occupied seats. If the appropriate seat cooler or coolers are activated, it is anticipated that sufficient cooling is being provided by the seat coolers to the vehicle occupants to maintain comfort. Accordingly, the system may be configured to initiate a stop-engine command at operation 424 when the seat coolers are turned on despite the cabin cooling requirement indicated by the target air outlet temperature or the cabin temperature. However, if the seat cooler or coolers are not turned on, the process progresses to operation 422 at which time a stop-engine command is inhibited because of a cabin cooling requirement (i.e., the engine is required to operate the air-conditioning-system compressor to provide sufficient chilled air for the cabin) to disable an auto-stop stop-engine command.

The above processes described with reference to FIGS. 3 and 4 illustrate examples by which the system (e.g., the auto start control circuit 210) may evaluate and determine whether to generate a start-engine command on the basis of the need for the vehicle HVAC system to provide cooling to the occupants. It is noted that a start-engine command may be initiated for other reasons independent of HVAC system requirements such as, for example, to charge the battery such that the vehicle accessories may remain on.

In the above-described examples, the order of the operations may be different from the order described. For example, the system may evaluate a cabin temperature before evaluating the air outlet temperature. Likewise, the monitored parameters may be continuously monitored in real time while the vehicle is in an auto stop condition to determine at any time during the auto stop condition whether a start-engine command should be initiated.

Although an HVAC system is generally defined as a heating, ventilating and air-conditioning system, the term HVAC system as used herein may refer to a system that provides air conditioning only, heating and ventilating without air-conditioning, heating and air-conditioning, heating ventilating and air-conditioning, or other vehicle climate control system.

In some implementations, the system may only check the status of the vehicle operator's seat cooler. In other implementations, the system may check the status of all seat coolers. In yet other implementations, the system may use sensors to determine which seats are occupied and only check the status of the seat coolers for those occupied seats. Sensors that may be used to determine which seats are occupied may include, for example, imaging systems to detect passengers, weight sensors to detect weight on seats within the vehicle, infrared sensors, and so on.

Figure 5:
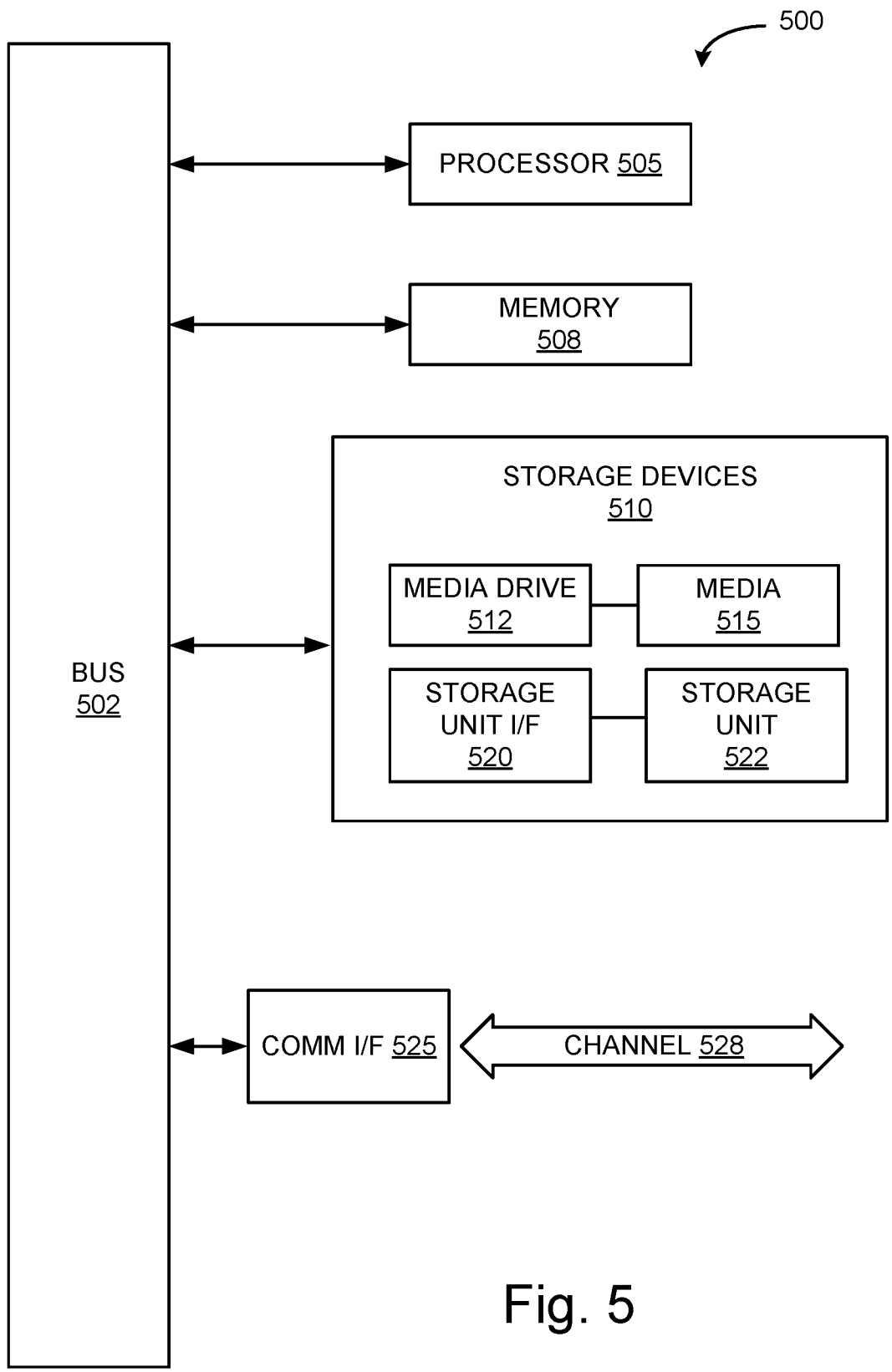
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 505 might be implemented using a general-purpose or special-purpose processing engine such as, for example, a microprocessor, controller, or other control logic. Processor 505 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 505. Main memory 508 might also be used for storing temporary variables or other intermediate information during execution of instructions to be executed by processor 505. Computing component 500 might likewise include a read only memory ("ROM") or other static storage device coupled to bus 502 for storing static information and instructions for processor 505.

The computing component 500 might also include one or more various forms of information storage mechanism 510, which might include, for example, a media drive 512 and a storage unit interface 520. The media drive 512 might include a drive or other mechanism to support fixed or removable storage media 515. For example, a hard disk drive, a solid-state drive, a magnetic tape drive, an optical drive, a compact disc (CD) or digital video disc (DVD) drive (R or RW), or other removable or fixed media drive might be provided. Storage media 515 might include, for example, a hard disk, an integrated circuit assembly, magnetic tape, cartridge, optical disk, a CD or DVD. Storage media 515 may be any other fixed or removable medium that is read by, written to or accessed by media drive 512. As these examples illustrate, the storage media 515 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 525. Communications interface 525 might be used to allow software and data to be transferred between computing component 500 and external devices. Examples of communications interface 525 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 525 may be carried on signals, which can be electronic, electromagnetic (which includes optical) or other signals capable of being exchanged by a given communications interface 525. These signals might be provided to communications interface 525 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 515, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for managing auto start of a vehicle during an auto-stop condition, the method comprising:
   receiving a target air outlet temperature from a vehicle climate control system;
   receiving data indicating a cooled seat of the vehicle is activated;
   determining a cabin cooling requirement based on the target air outlet temperature;
   determining that a start-engine condition exists because of the cabin cooling requirement; and
   inhibiting a start-engine command to restart an internal combustion engine of the vehicle because of the cabin cooling requirement in response to the data indicating that the cooled seat of the vehicle is activated.

2. The method of claim 1, further comprising determining whether a cabin temperature of the vehicle is above a determined cabin threshold temperature, and wherein inhibiting the start-engine command to restart the internal combustion engine comprises delaying a request to restart the internal combustion engine because of the cabin cooling requirement in response to the data indicating that the cooled seat of the vehicle is activated and the cabin temperature of the vehicle is above the determined cabin threshold temperature.

3. The method of claim 1, further comprising:
   determining each occupied seat of the vehicle,
   wherein the data indicating that the cooled seat of the vehicle is activated comprises data indicating, for each occupied seat, whether a corresponding cooler is activated or not activated, and
   wherein inhibiting the start-engine command to restart the internal combustion engine occurs in response to the data indicating that, for each occupied seat, the corresponding cooler is activated.

4. The method of claim 1, wherein inhibiting the start-engine command to restart the internal combustion engine because of the cabin cooling requirement comprises delaying the start-engine command for a determined period of time.

5. The method of claim 1, wherein inhibiting the start-engine command to restart the internal combustion engine because of the cabin cooling requirement comprises delaying the start-engine command until another vehicle event causes a restart.

6. A vehicle, comprising:
   a plurality of sensors;
   a climate control system; and
   an auto-start control circuit comprising an input to receive data indicating a cooled seat of the vehicle is activated and an input to receive data from the climate control system indicating a target air outlet temperature, the auto-start control circuit configured to:
      determine a cabin cooling requirement based on the target air outlet temperature;
      determine that a start-engine condition exists because of the cabin cooling requirement; and
      inhibit a start-engine command to restart an internal combustion engine of the vehicle because of the cabin cooling requirement in response to the data indicating that the cooled seat of the vehicle is activated.

7. The vehicle of claim 6, further comprising a cabin temperature sensor and wherein the auto-start control circuit is further configured to determine whether a cabin temperature of the vehicle is above a determined cabin threshold temperature, and wherein inhibiting the start-engine command to restart the internal combustion engine comprises delaying the start-engine command to restart the internal combustion engine because of the cabin cooling requirement in response to the data indicating that the cooled seat of the vehicle is activated and the cabin temperature of the vehicle is above the determined cabin threshold temperature.

8. The vehicle of claim 6, further comprising sensors for determining each occupied seat of the vehicle, wherein the data indicating that the cooled seat of the vehicle is activated comprises data indicating, for each occupied seat, whether a corresponding cooler is activated or not activated, and wherein inhibiting the start-engine command occurs in response to the data indicating that, for each occupied seat, the corresponding cooler is activated.

9. The vehicle of claim 6, wherein inhibiting the start-engine command to restart the internal combustion engine because of the cabin cooling requirement comprises delaying the start-engine command for a determined period of time.

10. The vehicle of claim 6, wherein inhibiting the start-engine command to restart the internal combustion engine because of the cabin cooling requirement comprises delaying the start-engine command until another vehicle event causes a restart.

11. An auto start control circuit for a vehicle comprising an internal combustion engine, the auto start control circuit comprising a processor and a non-transitory machine-readable medium storing machine-readable instructions executable by the processor, the machine-readable instructions causing the processor to perform the operations of:
    determining a target air outlet temperature from a vehicle climate control system of the vehicle;
    receiving data indicating a cooled seat of the vehicle is activated;
    determining a cabin cooling requirement based on the target air outlet temperature;
    determining that a start-engine condition exists because of the cabin cooling requirement; and
    inhibiting a start-engine command to restart the internal combustion engine because of the cabin cooling requirement in response to the data indicating that the cooled seat of the vehicle is activated.

12. The auto start control circuit of claim 11, further comprising determining whether a coolant temperature of the vehicle is above a determined cabin threshold temperature, and wherein inhibiting the start-engine command to restart the internal combustion engine comprises delaying a request to restart the internal combustion engine because of the cabin cooling requirement in response to the data indicating that the cooled seat of the vehicle is activated and the coolant temperature of the vehicle is below the determined cabin threshold temperature.

13. A method for managing autostop of a vehicle during an auto-stop condition, the method comprising:
    determining an operational status of a vehicle climate control system;
    receiving a target air outlet temperature from the vehicle climate control system;
    receiving data indicating a cooled seat of the vehicle is activated; and
    initiating, in response to the data indicating that the cooled seat of the vehicle is activated, a stop-engine command to stop an internal combustion engine of the vehicle despite a cabin cooling requirement that would otherwise cause the internal combustion engine to remain on.

14. The method of claim 13, further comprising determining each occupied seat of the vehicle, wherein the data indicating that the cooled seat of the vehicle is activated comprises data indicating, for each occupied seat, whether a corresponding cooler is activated or not activated, and wherein initiating the stop-engine command to stop the internal combustion engine of the vehicle occurs in response to the data indicating that, for each occupied seat, the corresponding cooler is activated.

15. A vehicle, comprising:
    a plurality of sensors;
    a climate control system; and
    an auto-start control circuit comprising an input to receive data indicating a cooled seat of the vehicle is activated and an input to receive data from the climate control system indicating a target air outlet temperature, the auto-start control circuit configured to:
        determine that a stop-engine condition is inhibited because of a cabin cooling requirement associated with the target air outlet temperature; and
        initiate a stop-engine command to stop an internal combustion engine of the vehicle despite the cabin cooling requirement in response to the data indicating that the cooled seat of the vehicle is activated.

16. The vehicle of claim 15, further comprising a cabin temperature sensor and wherein the auto-start control circuit is further configured to determine whether a cabin temperature of the vehicle is above a determined cabin threshold temperature, and wherein initiating the stop-engine command to stop the internal combustion engine comprises initiating the stop-engine command to stop the internal combustion engine because of the cabin cooling requirement in response to the data indicating that the cooled seat of the vehicle is activated and the cabin temperature of the vehicle is above the determined cabin threshold temperature.

17. The vehicle of claim 15, further comprising sensors for determining each occupied seating position of the vehicle, wherein the data indicating that the cooled seat of the vehicle is activated comprises data indicating, for each occupied seating position of the vehicle, whether a respective cooled seat is activated or not activated, and wherein initiating the stop-engine command occurs in response to the data indicating the respective cooled seat is activated for each occupied seating position of the vehicle.

18. An auto start control circuit for a vehicle comprising an internal combustion engine, the auto start control circuit comprising a processor and a non-transitory machine-readable medium storing machine-readable instructions executable by the processor, the machine-readable instructions causing the processor to perform the operations of:
    receiving a target air outlet temperature from a vehicle climate control system;
    receiving data indicating a cooled seat of the vehicle is activated;
    determining that a stop-engine condition is inhibited because of a cabin cooling requirement associated with the target air outlet temperature; and
    initiating a stop-engine command to stop the internal combustion engine of the vehicle despite the cabin cooling requirement in response to the data indicating that the cooled seat of the vehicle is activated.

* * * * *